United States Patent
McAuliffe et al.

(10) Patent No.: US 10,997,231 B2
(45) Date of Patent: May 4, 2021

(54) IMAGE-BASED ONTOLOGY REFINEMENT USING CLUSTERS

(71) Applicant: International Business Machines Corporation, Armonk, NY (US)

(72) Inventors: Darren McAuliffe, Cortlandt, NY (US); Tamer E. Abuelsaad, Yorktown, NY (US); Fabrizio Jose Pisciotta Sanabria, Washington, DC (US)

(73) Assignee: International Business Machines Corporation, Armonk, NY (US)

(*) Notice: Subject to any disclaimer, the term of this patent is extended or adjusted under 35 U.S.C. 154(b) by 120 days.

(21) Appl. No.: 16/250,198

(22) Filed: Jan. 17, 2019

(65) Prior Publication Data

US 2020/0233899 A1     Jul. 23, 2020

(51) Int. Cl.

| | |
|---|---|
| *G06F 16/00* | (2019.01) |
| *G06F 16/55* | (2019.01) |
| *G06F 16/901* | (2019.01) |
| *G06K 9/62* | (2006.01) |
| *G06K 9/00* | (2006.01) |

(52) U.S. Cl.
CPC .......... *G06F 16/55* (2019.01); *G06F 16/9024* (2019.01); *G06K 9/00624* (2013.01); *G06K 9/622* (2013.01); *G06K 9/6267* (2013.01)

(58) Field of Classification Search
CPC . G06F 16/55; G06F 16/9024; G06K 9/00624; G06K 9/622; G06K 9/6267
See application file for complete search history.

(56) References Cited

U.S. PATENT DOCUMENTS

| | | |
|---|---|---|
| 7,103,506 B2 | 9/2006 | Friedrich et al. |
| 7,644,102 B2 | 1/2010 | Gaussier et al. |
| 8,200,671 B2 | 6/2012 | Labrou et al. |
| 8,799,294 B2 | 8/2014 | Bouillet et al. |
| 9,922,032 B2 | 3/2018 | Lightner et al. |
| 2014/0176603 A1 | 6/2014 | Kumar et al. |
| 2014/0310595 A1 | 10/2014 | Acharya et al. |
| 2017/0185869 A1* | 6/2017 | Dua .......................... G06K 9/52 |
| 2018/0060782 A1 | 3/2018 | Chee et al. |
| 2019/0354689 A1* | 11/2019 | Li ............................ G06N 3/08 |

FOREIGN PATENT DOCUMENTS

WO     2018076348 A1     5/2018

OTHER PUBLICATIONS

Hervas et al., "Achieving Adaptive Augmented Reality through Ontological Context-Awareness applied to AAL Scenarios", Journal of Universal Computer Science, vol. 19, No. 9, 2013, pp. 1334-1349.

(Continued)

*Primary Examiner* — Pakee Fang
(74) *Attorney, Agent, or Firm* — James L. Olsen

(57) ABSTRACT

Aspects of the present disclosure relate to ontology refinement using image processing. A scene and a set of objects within the scene of an image are identified by performing image processing on the image. The set of objects is stored in a cluster labeled by the scene. A knowledge graph is then refined using the cluster.

15 Claims, 7 Drawing Sheets

(56) References Cited

OTHER PUBLICATIONS

Hatala et al., "Ontology-Based User Modeling in an Augmented Audio Reality System for Museums", User Modeling and User-Adapted Interaction, Aug. 2005, vol. 15, Issue 3-4, pp. 339-380.
Schmalstieg et al., "The World as a User Interface: Augmented Reality for Ubiquitous Computing", Location Based Services and TeleCartography, 2004, Abstract Only, 8 pages.
Globerson et al., "Euclidean Embedding of Co-occurrence Data", Journal of Machine Learning Research 8, 2007, pp. 2265-2295.
Muppalla et al., "A Knowledge Graph Framework for Detecting Traffic Events Using Stationary Cameras", Workshop: Industrial Knowledge Graphs, Jun. 25-28, 2017, pp. 431-436.
Mell et al., "The NIST Definition of Cloud Computing", Recommendations of the National Institute of Standards and Technology, Sep. 2011, 7 pages.

* cited by examiner

IMAGE-BASED ONTOLOGY REFINEMENT USING CLUSTERS

BACKGROUND

The present disclosure relates generally to the field of ontologies, and in particular to refining ontologies using image processing.

Ontologies are used to compartmentalize and relate representational knowledge. In the broadest aspect, an ontology is a domain representation. The domain includes classes, objects, relations, and attributes (e.g., object properties). Ontologies can be represented by a knowledge graph (KG), which illustrates, among other things, relationships between objects present in the ontological domain. Ontologies can be used for information retrieval, such as in conversational or question/answer (Q/A) systems.

SUMMARY

Embodiments of the present disclosure include a method, computer program product, and system for refining a knowledge graph using image processing. A scene and a set of objects within the scene of an image can be identified by performing image processing on the image. The set of objects can be stored in a cluster labeled by the scene. A knowledge graph can then be refined using the cluster.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
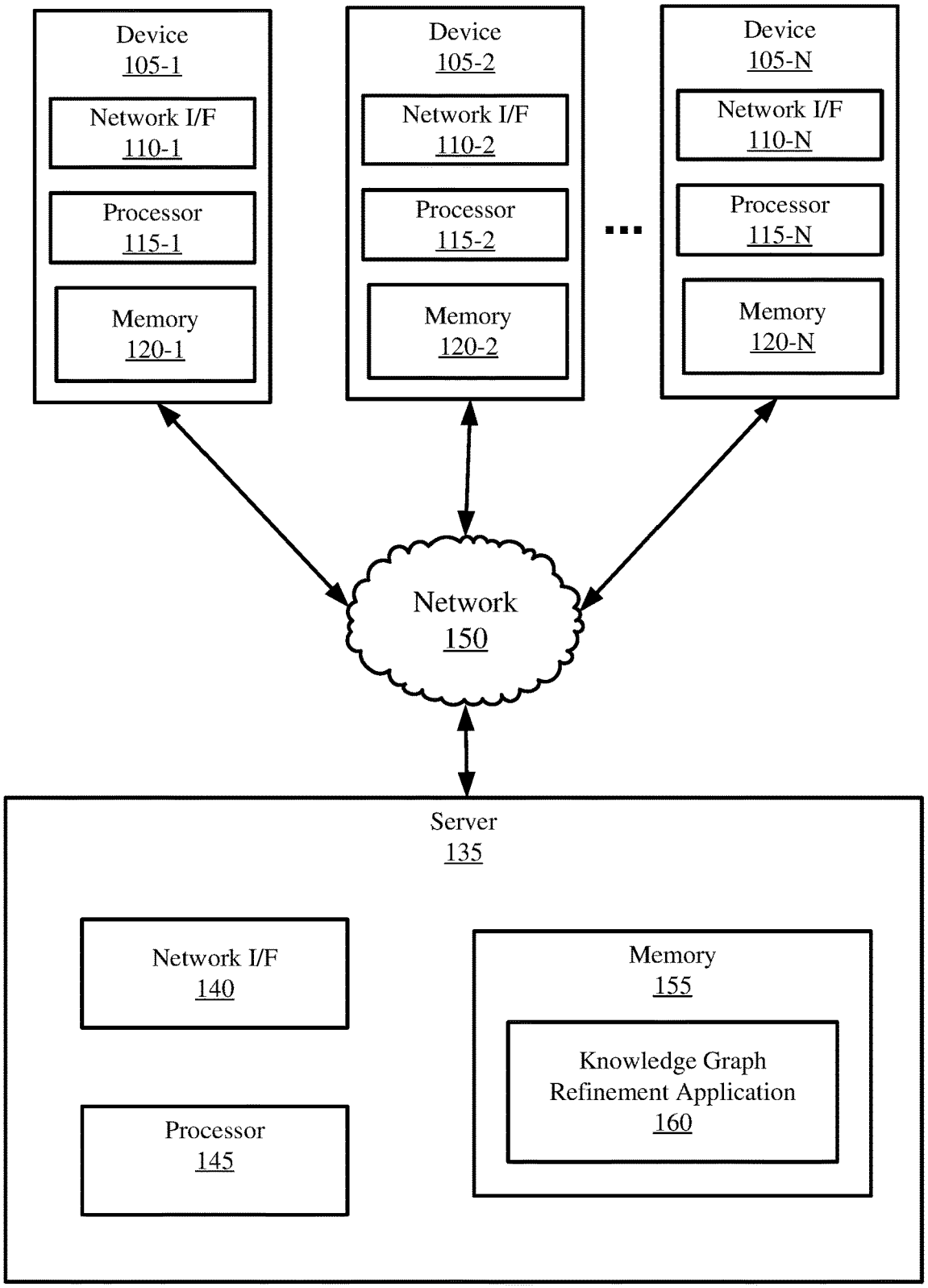
FIG. 1 is a block diagram illustrating an example computing environment in which illustrative embodiments of the present disclosure can be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of ontologies, and in particular to refining ontologies using image processing. While the present disclosure is not necessarily limited to such applications, various aspects of the disclosure can be appreciated through a discussion of various examples using this context.

Ontologies are used to compartmentalize and relate representational knowledge. In the broadest aspect, an ontology is a domain representation. The domain includes classes, objects, relationships, and attributes. Ontologies can be represented by a knowledge graph (KG), which illustrates, among other things, relationships between objects present in the ontological domain. Ontologies can be used for information retrieval, such as in conversational or question/answer (Q/A) systems.

Existing knowledge graphs are often sparse and have many informational gaps. For example, objects can be missing or incorrect (e.g., due to evolving language over time), relationships between objects (e.g., hierarchical or functional relationships) may be missing or incorrect, attributes describing objects may be missing, etc. Refining (e.g., extending) knowledge graphs often requires manual input of classes, objects, relationships, and attributes. This can require oversight by subject matter experts, which adds to the time and expense required to extend the knowledge graph.

Aspects of the present disclosure address the aforementioned complications by refining (e.g., adding, removing, and/or rearranging elements within) knowledge graphs using image processing. An image can be analyzed using image processing techniques to identify a scene and a set of objects within the scene. The set of objects can then be stored in a cluster (e.g., a data structure) labeled by the scene. A knowledge graph can then be refined based on the cluster (e.g., adding new objects and/or relationships to the knowledge graph based on the composition of the cluster).

By automatically refining a knowledge graph using image processing, manual intervention can be reduced. This can significantly improve the speed at which a knowledge graph can be extended (e.g., hundreds or thousands of images can be processed and integrated into a knowledge graph within a short time frame based on processing constraints). Further, because the knowledge graph is extended, the knowledge graph covers a greater breadth of information. For example, when an extended knowledge graph is queried (e.g., during a conversational or Q/A session), previously missing concepts or relationships may now be present. This improves the usability of conversational and Q/A systems insofar as these systems reference a knowledge graph which was refined using the methods described herein.

Turning now to the figures, FIG. 1 is a block diagram illustrating an example computing environment 100 in which illustrative embodiments of the present disclosure can be implemented. Computing environment 100 includes a plurality of devices 105-1, 105-2 . . . 105-N (collectively devices 105), at least one server 135, and a network 150.

Consistent with various embodiments, the server 135 and the devices 105 are computer systems. The devices 105 and the server 135 include one or more processors 115-1, 115-2 . . . 115-N (collectively processors 115) and 145 and one or more memories 120-1, 120-2 ... 120-N (collectively memories 120) and 155, respectively. The devices 105 and the server 135 can be configured to communicate with each other through internal or external network interfaces 110-1, 110-2 ... 110-N (collectively network interfaces 110) and 140. The network interfaces 110 and 140 are, in some embodiments, modems or network interface cards. The devices 105 and/or the server 135 can be equipped with a display or monitor. Additionally, the devices 105 and/or the server 135 can include optional input devices (e.g., a keyboard, mouse, scanner, video camera, or other input device), and/or any commercially available or custom software (e.g., browser software, communications software, server software, natural language processing software, search engine and/or web crawling software, image processing software, etc.). The devices 105 and/or the server 135 can be servers, desktops, laptops, or hand-held devices.

The devices 105 and the server 135 can be distant from each other and communicate over a network 150. In some embodiments, the server 135 can be a central hub from which devices 105 can establish a communication connection, such as in a client-server networking model. Alternatively, the server 135 and devices 105 can be configured in any other suitable networking relationship (e.g., in a peer-to-peer (P2P) configuration or using any other network topology).

In some embodiments, the network 150 can be implemented using any number of any suitable communications media. For example, the network 150 can be a wide area network (WAN), a local area network (LAN), an internet, or an intranet. In certain embodiments, the devices 105 and the server 135 can be local to each other and communicate via any appropriate local communication medium. For example, the devices 105 and the server 135 can communicate using a local area network (LAN), one or more hardwire connections, a wireless link or router, or an intranet. In some embodiments, the devices 105 and the server 135 can be communicatively coupled using a combination of one or more networks and/or one or more local connections. For example, the first device 105-1 can be hardwired to the server 135 (e.g., connected with an Ethernet cable) while the second device 105-2 can communicate with the server 135 using the network 150 (e.g., over the Internet).

In some embodiments, the network 150 is implemented within a cloud computing environment, or using one or more cloud computing services. Consistent with various embodiments, a cloud computing environment can include a network-based, distributed data processing system that provides one or more cloud computing services. Further, a cloud computing environment can include many computers (e.g., hundreds or thousands of computers or more) disposed within one or more data centers and configured to share resources over the network 150.

The server 135 includes a knowledge graph refinement application 160. The knowledge graph refinement application 160 can be configured to refine (e.g., extend, remove elements from, rearrange elements within, etc.) a knowledge graph using image processing techniques (e.g., multi-object recognition, scene classification, deep learning, etc.). To do so, the knowledge graph refinement application 160 can be configured to receive an image, analyze the image to determine one or more objects and/or scenes within the image, build and/or refine one or more clusters based on the scenes and images, and use the clusters to refine a knowledge graph.

It is noted that FIG. 1 is intended to depict the representative major components of an example computing environment 100. In some embodiments, however, individual components can have greater or lesser complexity than as represented in FIG. 1, components other than or in addition to those shown in FIG. 1 can be present, and the number, type, and configuration of such components can vary.

While FIG. 1 illustrates a computing environment 100 with a single server 135, suitable computing environments for implementing embodiments of this disclosure can include any number of servers. The various models, modules, systems, and components illustrated in FIG. 1 can exist, if at all, across a plurality of servers and devices. For example, some embodiments can include two servers. The two servers can be communicatively coupled using any suitable communications connection (e.g., using a WAN, a LAN, a wired connection, an intranet, or the Internet).

Figure 2:
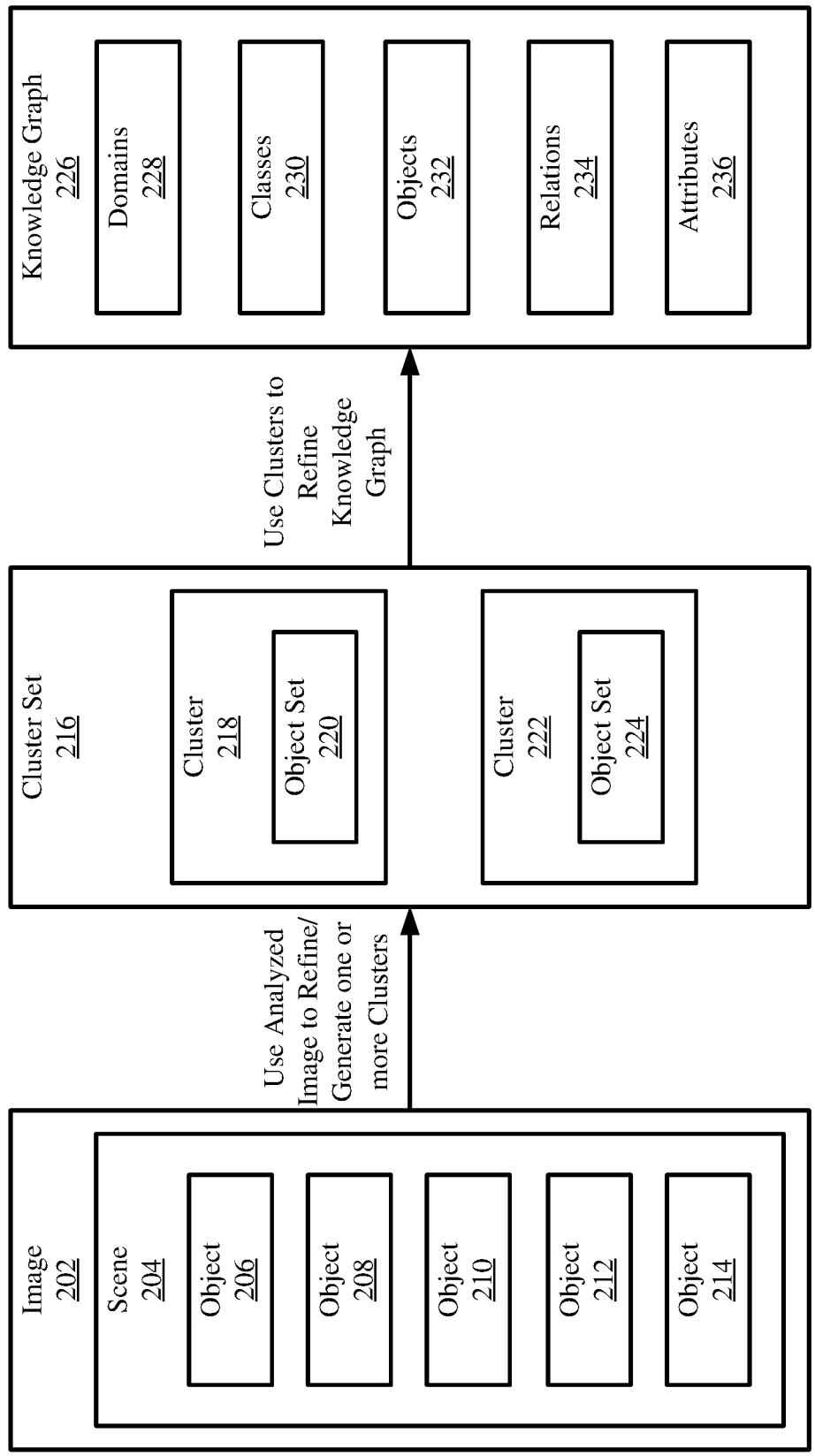
FIG. 2 is a block diagram illustrating image-based knowledge graph refinement, in accordance with embodiments of the present disclosure.

FIG. 2 is a block diagram illustrating the refinement of a knowledge graph 226 using an image 202, in accordance with embodiments of the present disclosure. This refinement can be performed, for example, by knowledge graph refinement application 160 (shown in FIG. 1).

The image 202 can include a scene 204 and a plurality of objects 206-214. The scene 204 can depict the environment in which the objects 206-214 reside. For example, if the image 202 is of (or contains) an open refrigerator and the contents therein, the scene 204 can be labeled as "refrigerator," while the plurality of objects 206-214 can be the items stored in the refrigerator (e.g., orange juice, milk, an apple, peppers, etc.). Similarly, if the image 202 is of (or contains) a living room, the scene 204 can be labeled as "living room," while the plurality of objects 206-214 can be labeled as respective items within the living room (e.g., chair, coffee table, drinking glass, television, etc.).

The scene 204 and objects 206-214 can be identified (e.g., determined) in any suitable manner. For example, scene classification techniques (e.g., based on convolutional neural networks, clustering, machine learning, etc.) and object recognition techniques (e.g., edge detection, grayscale matching, gradient matching, invariance, geometric hashing, scale-invariant feature transform (SIF), speed up robust features (SURF), pose clustering, machine learning, photogrammetry, etc.) can be used to identify scenes and/or objects. An example of a multi-object recognition tool is Watson® Visual Recognition (a registered trademark of International Business Machines (IBM) Corporation).

In embodiments, multiple scenes can exist in a single image. For example, an image may capture both a living room scene and a kitchen scene. As contemplated herein, a "scene" is merely a class in which one or more objects reside. That is, a scene is hierarchically superior to one or more objects (e.g., or sub-scenes) which reside within the scene. For example, a house scene may include both living room and kitchen scenes. Further, the kitchen scene may include a refrigerator scene housing a plurality of objects.

As contemplated herein, image 202 can be any visual medium, including, but not limited to, flat images, extended reality (XR) images, virtual reality (VR) images (e.g., 360° images), live photos, videos (e.g., image frames of a video), etc. Further, the image can be of any suitable format (e.g., tiff, jpeg, gif, png, etc.). In embodiments, the type of scene classification and/or object recognition can depend on the type of visual medium and/or image format. In some embodiments, images of particular formats can be reformatted to conform with image processing requirements.

Once the scene 204 and the objects 206-214 are identified within the image 202, the scene 204 and objects 206-214 are used to refine and/or generate one or more clusters of a cluster set 216. Clusters are data structures (e.g., a table, matrix, etc.) which organize objects into groups. The clusters can be designated as scenes in which objects are captured. For example, cluster 218 can be labeled as scene 204, and can be designated as including objects 206-214 within object set 220. Cluster 222 can be another scene (e.g., living room) having another object set 224 (e.g., chair, coffee table, television, etc.) that has been generated in the past from another image (not shown). In some embodiments, clusters may exist within other clusters (e.g., a house cluster may contain a living room and kitchen cluster).

Existing clusters within the cluster set 216 can be modified based on the image 202. For example, assume a cluster for "refrigerator" already exists. Further, assume a newly captured image of a refrigerator is analyzed and integrated into the refrigerator cluster. In this example, any items which are new to the existing refrigerator cluster can be added. For example, if the refrigerator cluster does not include the object "orange juice," orange juice can be added to the refrigerator cluster.

In embodiments, a total running number of object instances (e.g., observations) within a cluster can be stored. Following the example above, if an object "milk" was observed within the refrigerator cluster 12 times, then the refrigerator cluster can have a metadata attribute of "12" associated with milk. The number of instances an object appears within a cluster can indicate membership strength (e.g., how closely an object is associated with a cluster). This can also depend on the total number of times the cluster was observed. For example, if milk was observed in 12 instances out of 12 total refrigerator observations, then the membership strength between refrigerator and milk can be relatively high (e.g., 12/12 times a refrigerator was captured, milk was present). In contrast, if milk was observed 12 instances out of 100 total refrigerator observations, then the membership strength between refrigerator and milk can be relatively low (e.g., 12/100 times a refrigerator was captured, milk was present). The membership strength can be used when determining whether to make a relationship within a knowledge graph and/or when determining the strength of relationships within a knowledge graph.

The cluster set 216 which was refined or generated based on the image 202 can then be used to refine the knowledge graph 226. That is, domains 228, classes 230 (e.g., superclasses and subclasses), objects 232, relations 234, and attributes 236 of the knowledge graph 226 can be modified based on the cluster set 216. For example, if an object "energy drink" within a scene "kitchen" was captured in the image 202, and the knowledge graph 226 previously did not include the object "energy drink," then energy drink can be added to the objects 232 of the knowledge graph 226 along with a hierarchical relationship that energy drink belongs within the class "kitchen." The object "energy drink" can also be mapped to other elements within the knowledge graph 226 (e.g., energy drink→is a→drink, energy drink→contained in→can, energy drink→contains→caffeine, etc.).

Based on the cluster set 216, domains 228 can be added to the knowledge graph 226, classes 230 can be added to the knowledge graph 226, objects 232 can be added to the knowledge graph 226, relations can be added, removed, or rearranged within the knowledge graph 226, and attributes can be added or modified within the knowledge graph 226.

Reference will now be made to various examples in which the knowledge graph 226 can be refined based on the cluster set 216.

In embodiments, objects and/or classes within the cluster set 216 can be added to the knowledge graph 226. For example, if an object "solid state drive (SSD)" was newly captured in a scene "computer tower," of an image, the object "SSD" can be added to the cluster set 216 and integrated into knowledge graph 226. The newly added object "SSD" can then be relationally mapped to other objects 232 and/or classes 230 within the knowledge graph 226 (e.g., SSD→is a→memory, SSD→contains→NAND flash memory, SSD→within→smart phone, etc.). The mapping processing can, in some embodiments, be completed based on one or more ontology refinement processes in the future (e.g., based on image processing). In some embodiments, the mapping processing can be manually completed by a subject matter expert.

In some embodiments, relations can be added between domains 228, classes 230, and objects 232 present in the knowledge graph 226. For example, if an object "candy" was newly captured in a scene "movie theater" of an image, then candy can be added to the cluster set 216 and integrated into the knowledge graph 226 under the object "movie theater." In this example, the relationship "contained in" can be added between candy and movie theater (e.g., candy→contained in→movie theater, or alternatively, movie theater→contains→candy).

In some embodiments, relations can be removed between domains 228, classes 230, and objects 232 present in the knowledge graph. As an example, assume a membership strength of 10% is required to maintain a relationship between an object and a class (e.g., the object must be observed within the class at least 10% of the total class observations). Further, assume that the object currently has been observed one time out of ten total class observations (e.g., the membership strength is 1/10=10%). In this example, if the class was observed again and the object was not present within the class, then the relationship between the object and class can be removed (as the new membership strength becomes 1/11=~9%).

In some embodiments, relations 234 can be maintained within the knowledge graph 226 regardless of membership strength. In these embodiments, the membership strength of each relation can be indicated as a metadata attribute. The membership strength can be used to determine whether to return a particular object or class as an output (e.g., during a conversation or Q/A session). For example, if a user queries "What is contained in an office?" only the objects with the highest membership strength may be returned (e.g., a chair, a pen, a desk, a computer, etc.), while low membership strength objects may not be returned (e.g., cookies, soft drinks, a fan, etc.).

In some embodiments, attributes 236 can be added to the knowledge graph 226 based on the contents of the image 202. In these embodiments, the image processing analysis may be configured to determine various attributes (e.g., traits, features, characteristics, parameters, aspects, etc.) that an object or class may have. These attributes can be stored as metadata with respective objects and/or classes when generating or refining a cluster. The metadata attributes of the cluster can then be added to the knowledge graph. For example, assume an image including a scene "street" is captured with an object "car." In this example, an image processing analysis may be configured to determine a color of the car. The color of the car can then be indicated as a metadata attribute of the object "car" within a cluster set. This metadata attribute can then be appended to the knowledge graph for the object "car" based on its inclusion in the cluster set.

It is noted that FIG. 2 is intended to depict the representative major components of a process for refining a knowledge graph using an image. In some embodiments, however, individual components can have greater or lesser complexity than as represented in FIG. 2, components other than or in addition to those shown in FIG. 2 can be present, and the number, type, and configuration of such components can vary. For example, in some embodiments, multiple images may be fed into the cluster set 216. In some embodiments, the image 202 may include two or more scenes, which may be hierarchically organized with respect to each other (e.g., superscenes and subscenes). Greater or fewer objects may be included in a scene. The cluster set 216 can include any suitable number of clusters and/or object sets. The knowledge graph 226 can include any number of additional elements (e.g., function terms, restrictions, rules, axioms, events, etc.).

Figure 3:
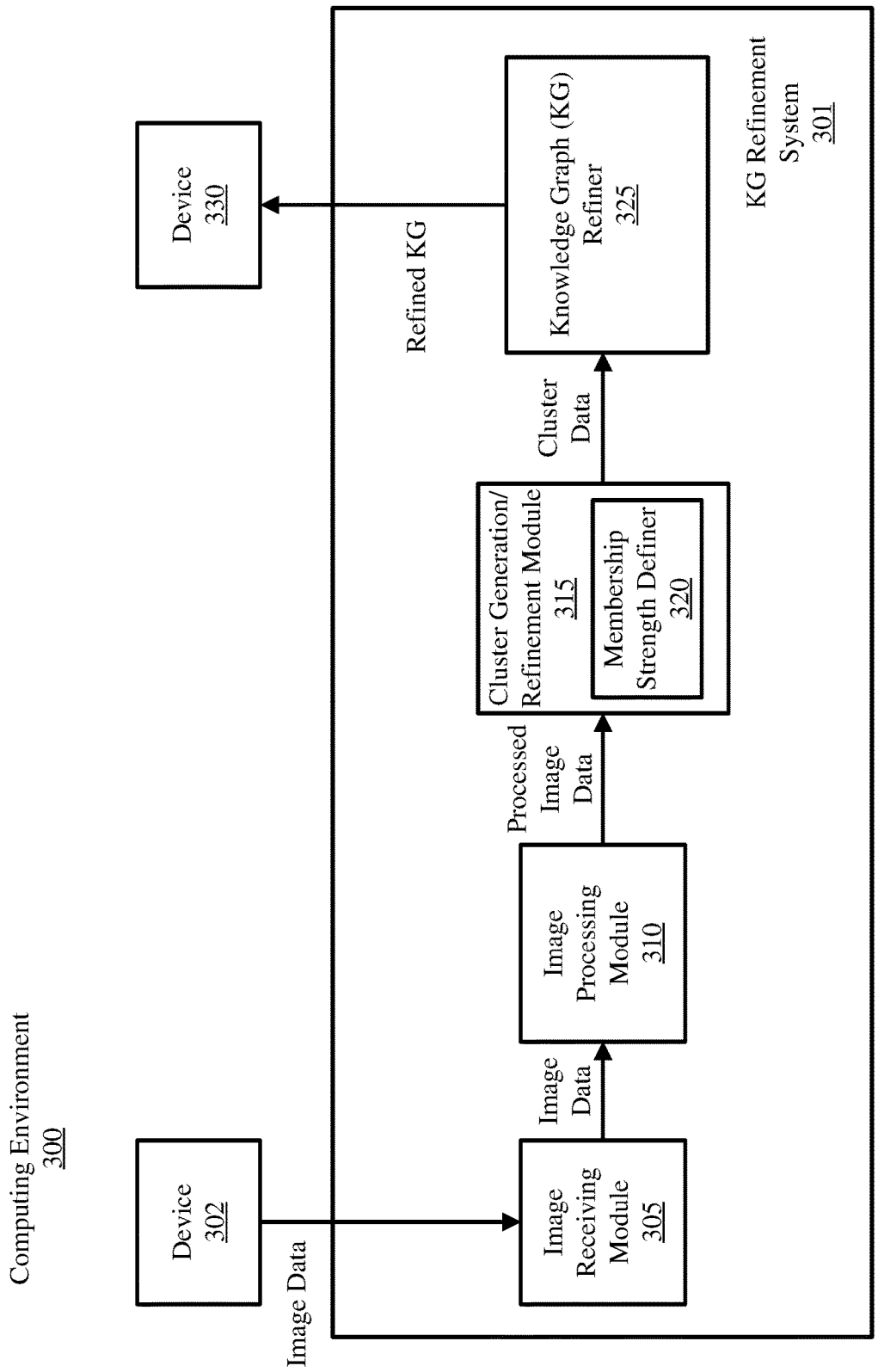
FIG. 3 is a block diagram illustrating an example computing environment including a knowledge graph refinement system, in accordance with embodiments of the present disclosure.

FIG. 3 is a block diagram illustrating an example computing environment 300 in which illustrative embodiments of the present disclosure can be implemented. The computing environment 300 includes a device 302, a knowledge graph refinement system 301, and a device 330. The knowledge graph refinement system 301 (e.g., which may be the same as, or substantially similar to, knowledge graph refinement application 160 of FIG. 1) includes an image receiving module 305, an image processing module 310, a cluster generation/refinement module 315, and a knowledge graph refiner 325. In embodiments, the image receiving module 305, image processing module 310, cluster generation/refinement module 315, and knowledge graph refiner 325 can be processor executable instructions that can be executed by a dedicated or shared processor using received inputs (e.g., from device 302).

Consistent with various embodiments, the image receiving module 305 can be configured to receive image data from the device 302 (e.g., devices 105 of FIG. 1). The image data can include any suitable image type/format. In some embodiments, the image receiving module 305 can be configured to receive videos (e.g., a plurality of image frames over time).

The image receiving module 305 then dispatches the image data to the image processing module 310. The image processing module 310 can be configured to perform scene and object recognition techniques (e.g., using convolutional neural networks, clustering, edge detection, grayscale matching, gradient matching, invariance, geometric hashing, scale-invariant feature transform (SIF), speed up robust features (SURF), pose clustering, machine learning, photogrammetry, etc.) to identify scenes and objects within the image data.

In embodiments, the image processing module 310 outputs classification label confidences (e.g., match certainties, confidence scores, etc.) for particular scenes and objects. The classification label confidence can indicate the likelihood that an object belongs to a classification output by the image processing module 310. In embodiments, classification label confidences can be used to determine whether scenes or objects will be considered when refining a knowledge graph. For example, in embodiments, a particular scene or object will only be integrated into a cluster or a knowledge graph if a classification label confidence score achieves a classification label confidence threshold. For example, assume a scene "forest" is captured with an object "mushroom." Further, assume a classification label confidence threshold of 40% is required to consider an object to be integrated into a knowledge graph. In this example, if the object "mushroom" only has a classification label confidence of 35%, then mushroom will not be considered when refining the knowledge graph (e.g., mushroom will not be integrated into a cluster set). This can prevent extending a knowledge graph based on erroneous data (e.g., blurry images, an object that resembles another object, etc.).

The processed image data is then dispatched from the image processing module 310 to the cluster generation/refinement module 315. The processed image data can include one or more images with classified scenes, objects, and corresponding classification label confidences. The cluster generation/refinement module 315 then generates one or more clusters and object sets based on the scenes and objects which were identified by the image processing module 310. In embodiments, the cluster generation/refinement module 315 dynamically updates a data structure (e.g., a table) based on received processed images over time.

The cluster generation/refinement module 315 includes a membership strength definer 320 configured to define membership strength between objects and clusters. This can be completed based on the total number of object observations within a given cluster. For example, the membership strength definer 320 can output a percentage (e.g., or fraction) indicative of the proportion an object is observed within a given cluster out of a total number of instances the cluster is observed (e.g., number of times object is observed within cluster/total number of cluster observations). For example, if an object "pencil" is observed in a scene "office" 75 out of 100 instances the scene "office" is observed, then the membership strength definer 320 can output a membership strength of 75% between the object "pencil" and the cluster corresponding to the scene "office." In some embodiments, the membership strength can exceed 100% (e.g., if multiple instances of the same object are visible in the same scene).

Membership strength can be used to determine whether to create relations between particular domains, classes, and objects within a knowledge graph. For example, in embodiments, a threshold membership strength may be required to create a relation between a given object and class. In some embodiments, relations may be created regardless of membership strength. In these embodiments, membership strength can be represented as an attribute of each relation.

Membership strength can be referenced when determining whether a particular output (e.g., during a conversational or Q/A session) is appropriate. For example, if a user queries a particular class within a knowledge graph (e.g., What type of memory is in a computer system?), only the objects with the highest membership strength may be output (e.g., RAM, HDD, flash, and cache).

In some embodiments, only objects having a membership strength which satisfies a membership strength threshold may be output when a particular class is queried. For example, if a membership strength threshold of 50% is required to output an object in response to a class query, only objects having a membership strength of 50% or higher will be output in response to the class query. Continuing this example, for a query "What equipment is located in a biosafety laboratory?", if objects and corresponding membership strengths for the class "biosafety laboratory" are: "HEPA Filter" 94%, "Biosafety Cabinet" 85%, "Centrifuge" 45%, "Autoclave" 79%, "Personal Protective Equipment" (PPE) 100%, and "Thermal Cycler" 30%, only the objects HEPA filter, Biosafety Cabinet, Autoclave, and PPE would be output (because they satisfy the membership strength threshold of 50%).

The cluster generation/refinement module 315 dispatches the cluster data to the knowledge graph refiner 325. The knowledge graph refiner 325 uses the cluster data to refine a knowledge graph. For example, one or more clusters and object sets (e.g., which may have stored metadata attributes)

can be used to refine domains, classes, objects, relations, and attributes present in a knowledge graph (see FIG. 2 for specific examples). In some embodiments, the clusters and object sets can be used to initially build a knowledge graph (e.g., in instances where a knowledge graph does not already exist).

The refined knowledge graph is then transmitted to the device 330. In embodiments, the knowledge graph can be used for information retrieval, such as in conversational, query-based (e.g., search algorithms), and Q/A systems.

It is noted that FIG. 3 is intended to depict the representative major components of an example computing environment 300. In some embodiments, however, individual components can have greater or lesser complexity than as represented in FIG. 3, components other than or in addition to those shown in FIG. 3 can be present, and the number, type, and configuration of such components can vary. For example, though two devices 302 and 330 are depicted in FIG. 3, more or fewer devices can be present. In some embodiments, a single device can capture an image, process the image, generate/refine one or more clusters, and refine a knowledge graph. In some embodiments, multiple devices or shared resources (e.g., a cloud computing environment) can collectively complete one or more of the functional aspects of the computing environment 300.

Figure 4:
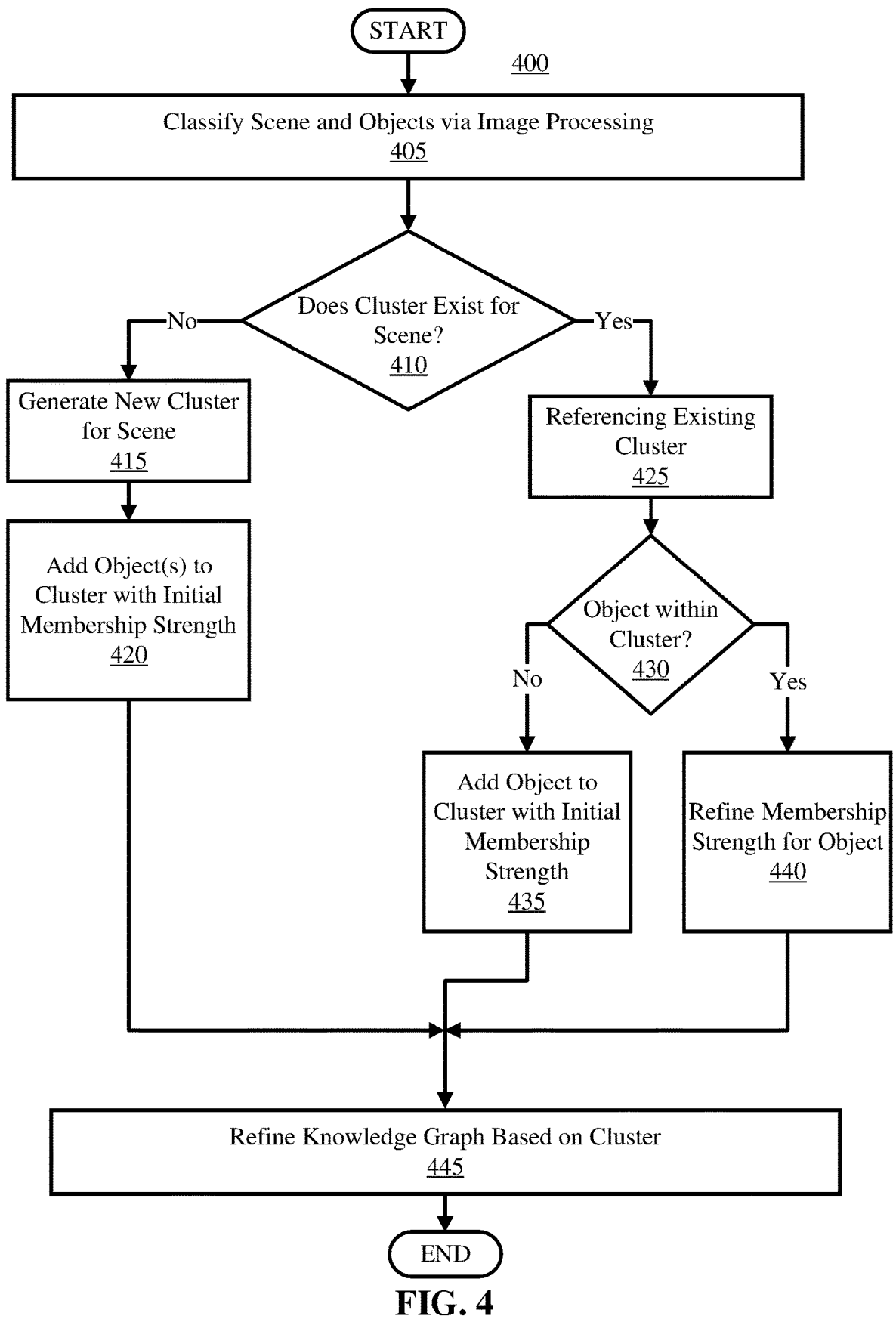
FIG. 4 is a flow-diagram illustrating an example method for refining a knowledge graph using image processing, in accordance with embodiments of the present disclosure.

FIG. 4 is a flow-diagram illustrating an example method 400 for refining a knowledge graph using image processing, in accordance with embodiments of the present disclosure.

Method 400 initiates at operation 405, where scene(s) and object(s) are classified within an image using image processing. The image processing may output a class (e.g., a label, description, name, etc.) for each scene and/or object identified in the image. In embodiments, the image processing may output classification label confidences indicating the likelihood that the scene(s) and/or object(s) match the respective classifications (e.g., based on a supervised or unsupervised machine learning model). The classification label confidence can be used to determine whether to proceed with (e.g., to refine a knowledge graph with) particular scene(s) and/or object(s) within an image. For example, some images may be blurry and not suitable for use in refining a knowledge graph. In blurry images, match certainties may be relatively low. Thus, using classification label confidence to dictate whether to refine a knowledge graph using an image can prevent erroneous extension of the knowledge graph.

A determination is then made whether a cluster already exists for a scene classified in the image (e.g., this can be completed for each scene in an image if multiple scenes are observed). This is illustrated at operation 410. If a determination is made that a scene does not exist, then a new cluster is generated for that scene. This is illustrated at operation 415. Objects recognized within the scene can then be added to the cluster with an initial membership strength (e.g., based on the number of occurrences of each object within the scene). This is illustrated at operation 420. The initial membership strength can depend on the cooccurrence between each object and the scene. In some embodiments, the initial membership strength can exceed 100% (e.g., if three instances of the same object are found within a scene).

If a determination is made that a cluster already exists for a particular scene, then the existing cluster corresponding to the scene is referenced. This is illustrated at operation 425. A determination is then made whether any objects within the scene already exist within the existing cluster. This is illustrated at operation 430. For objects which are not within the existing cluster, the objects are added with an initial membership strength. This is illustrated at operation 435. For objects which already exist within the existing cluster, the membership strength is updated (e.g., based on the number of occurrences of each object within the scene). This is illustrated at operation 440.

After object(s) are added to a new cluster with initial membership strengths, after object(s) are added to an existing cluster with initial membership strengths, or after refining membership strengths for objects already present in existing clusters, a knowledge graph is refined based on the cluster. This is illustrated at operation 445. Refining the knowledge graph can include, but is not limited to, adding objects, adding classes, adding or modifying relations, and adding or modifying attributes based on the newly generated and/or refined cluster set. Method 400 then terminates.

The aforementioned operations can be completed in any order and are not limited to those described. Additionally, some, all, or none of the aforementioned operations can be completed, while still remaining within the spirit and scope of the present disclosure.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
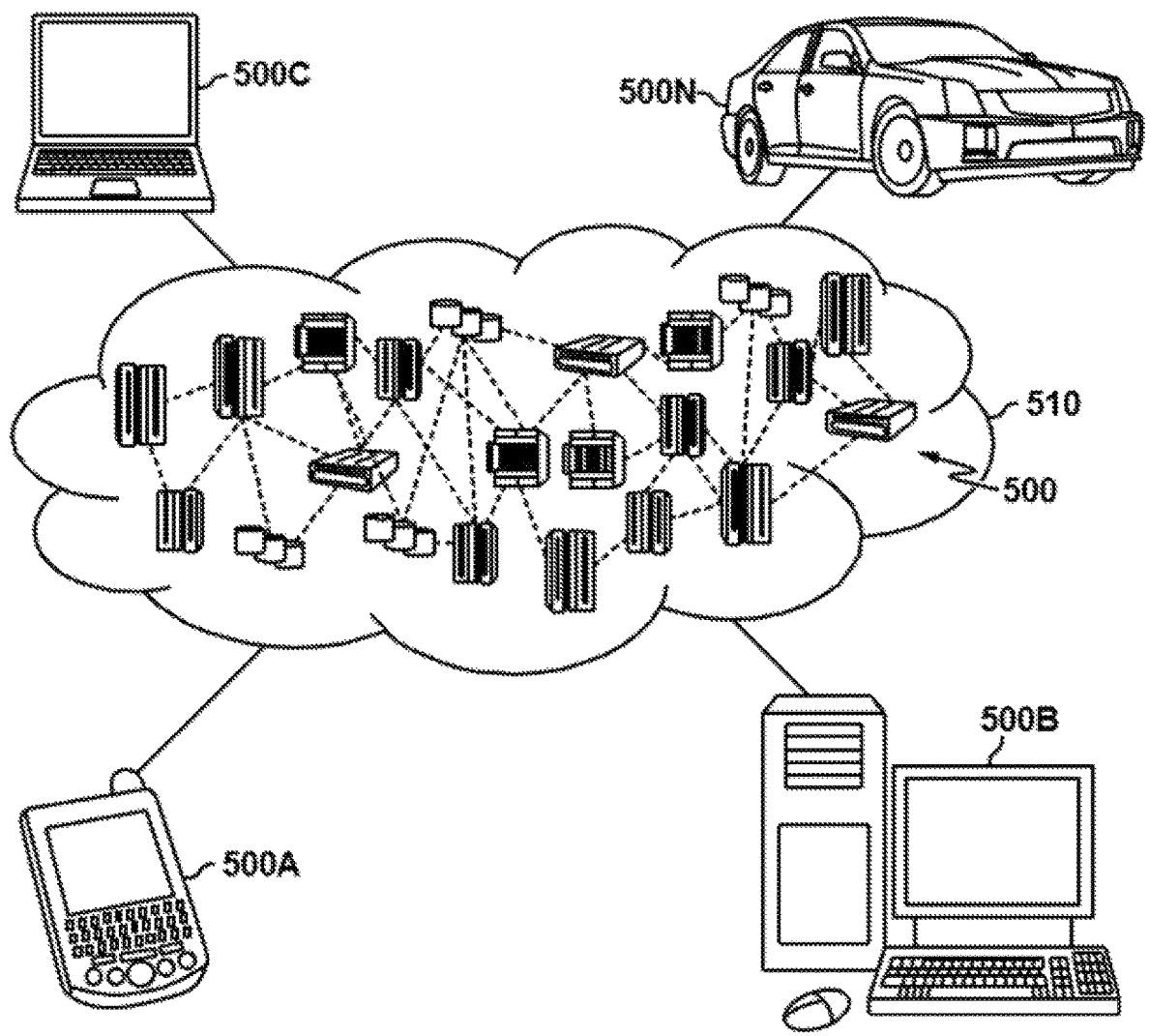
FIG. 5 is a diagram illustrating a cloud computing environment, in accordance with embodiments of the present disclosure.

Referring now to FIG. 5, illustrative cloud computing environment 510 is depicted. As shown, cloud computing environment 510 includes one or more cloud computing nodes 500 with which local computing devices used by cloud consumers, such as, for example, personal digital assistant (PDA) or cellular telephone 500A (e.g., devices 105, server 135, device 302, device 330), desktop computer 500B (e.g., devices 105, server 135, device 302, device 330) laptop computer 500C (e.g., devices 105, server 135, device 302, device 330), and/or automobile computer system 500N may communicate. Nodes 500 may communicate with one another. They may be grouped (not shown) physically or virtually, in one or more networks, such as Private, Community, Public, or Hybrid clouds as described hereinabove, or a combination thereof. This allows cloud computing environment 510 to offer infrastructure, platforms and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
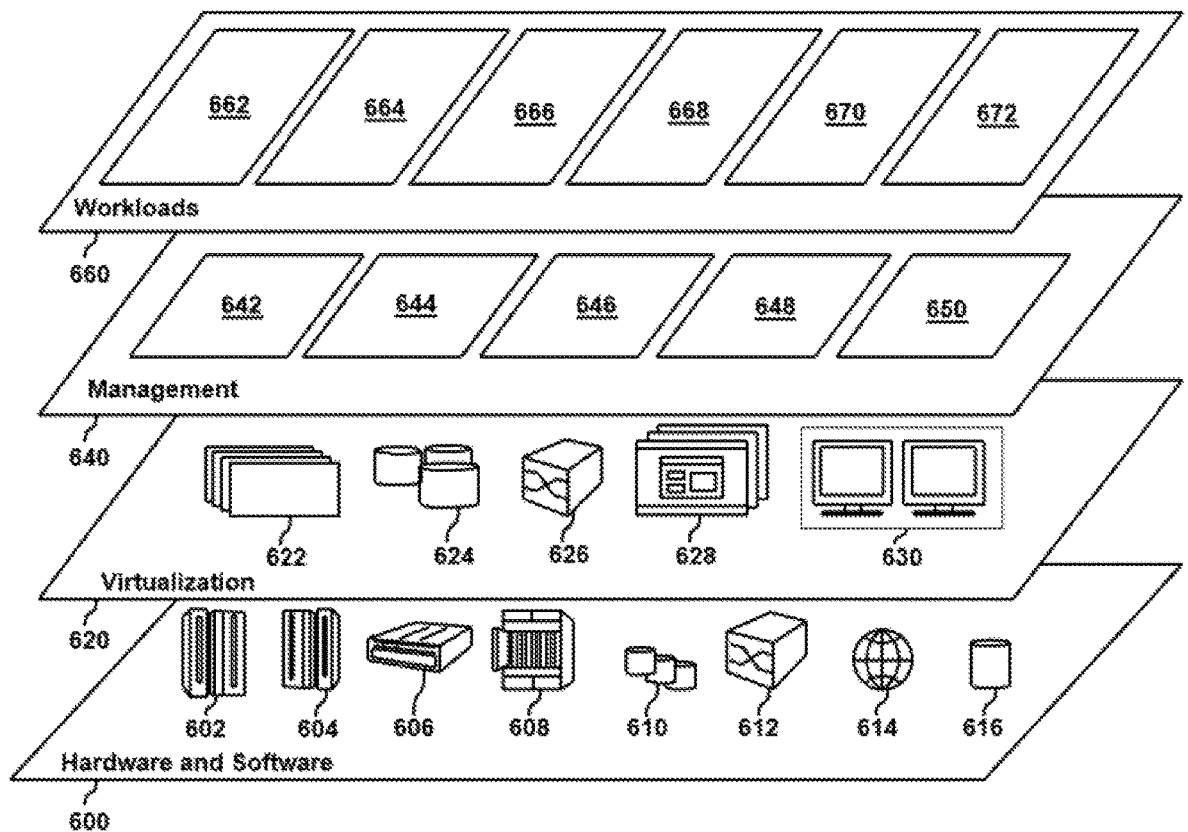
FIG. 6 is a block diagram illustrating abstraction model layers, in accordance with embodiments of the present disclosure.

Referring now to FIG. 6, a set of functional abstraction layers provided by cloud computing environment 510 (FIG. 5) is shown. It should be understood in advance that the components, layers, and functions shown in FIG. 6 are intended to be illustrative only and embodiments of the disclosure are not limited thereto. As depicted below, the following layers and corresponding functions are provided.

Hardware and software layer 600 includes hardware and software components. Examples of hardware components include: mainframes 602; RISC (Reduced Instruction Set Computer) architecture based servers 604; servers 606; blade servers 608; storage devices 610; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and Pricing 644 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 646 provides access to the cloud computing environment for consumers and system administrators. Service level management 648 provides cloud computing resource allocation and management such that required service levels are met. Service level management 648 may allocate suitable processing power and memory to process static sensor data. Service Level Agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 666; data analytics processing 668; transaction processing 670; and KG refinement 672.

Figure 7:
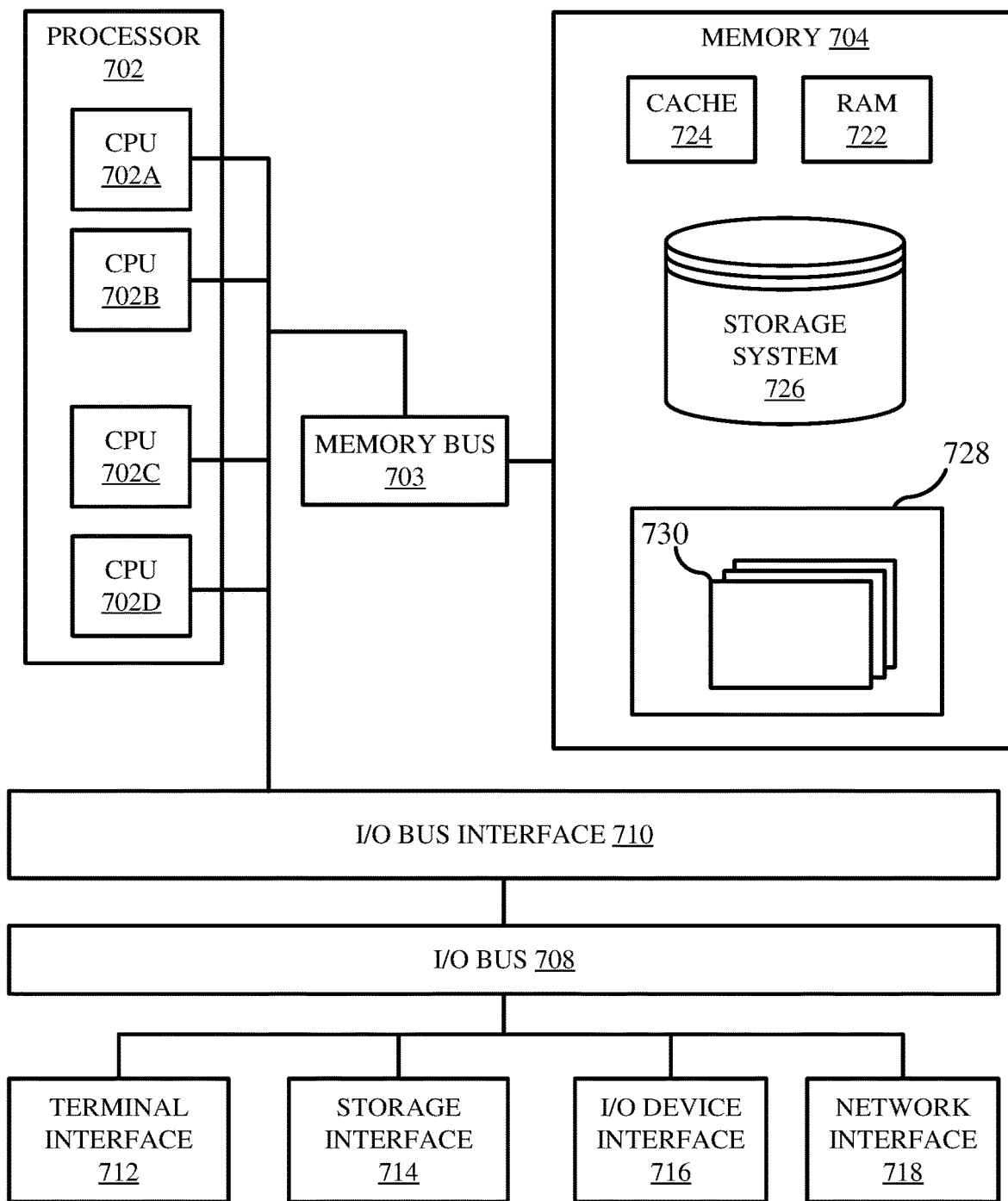
FIG. 7 is a high-level block diagram illustrating an example computer system that may be used in implementing one or more of the methods, tools, and modules, and any related functions, described herein, in accordance with embodiments of the present disclosure.

Referring now to FIG. 7, shown is a high-level block diagram of an example computer system 701 (e.g., devices 105, server 135, device 302, device 330) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 728 and/or program modules 730 generally perform the functions or methodologies of various embodiments.

In some embodiments, the program modules 730 of the computer system 701 may include a knowledge graph refinement module. The knowledge graph refinement module can be configured to refine a knowledge graph using image processing. An image may be analyzed using image processing techniques to determine a scene and a set of objects within the image. The scene can be stored as a cluster including the set of objects. The knowledge graph can then be refined using the cluster.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present disclosure can be a system, a method, and/or a computer program product. The computer program product can include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
    identifying, by performing image processing on an image, a scene and a set of objects within the scene of the image;
    storing, by a processor, the set of objects in a cluster labeled by the scene;
    refining, by the processor, using the cluster, a knowledge graph; and
    determining a membership strength between an object of the set of objects and the cluster labeled by the scene, wherein the membership strength is determined by dividing a number of times the object was observed within the scene by a total number of times the scene was observed.

2. The method of claim 1, further comprising:
    receiving a query related to the cluster labeled by the scene;
    determining whether the membership strength of the object satisfies a membership strength threshold; and
    outputting, in response to a determination that the membership strength of the object satisfies the membership strength threshold, the object as a response to the query.

3. The method of claim 1, wherein refining the knowledge graph includes:
    creating a classification corresponding to the cluster within the knowledge graph;
    determining whether the membership strength between the object and the cluster satisfies a membership strength threshold; and
    creating, in response to determining that the membership strength between the object and the cluster satisfies the membership strength threshold, a relationship between the object and the classification within the knowledge graph.

4. The method of claim 1, wherein refining the knowledge graph includes:
    creating a classification corresponding to the cluster; and
    creating a relationship between the classification and the set of objects within the knowledge graph.

5. The method of claim 1, wherein prior to storing the set of objects in the cluster labeled by the scene, the method further comprises:
    determining whether the cluster already exists for the scene;
    referencing, in response to determining that the cluster already exists for the scene, the existing cluster;
    determining whether an object within the set of objects is already within the cluster; and
    refining, in response to determining that the object is already within the cluster, a membership strength between the object and the cluster.

6. A system comprising:
    a memory storing program instructions; and
    a processor, wherein the processor is configured to execute the program instructions to perform a method comprising:
        identifying, using an image processing technique, a scene and a set of objects within the scene of an image;
        storing the set of objects in a cluster labeled by the scene;
        refining a knowledge graph using the cluster; and
        determining a membership strength between an object of the set of objects and the cluster labeled by the scene, wherein the membership strength is determined by dividing a number of times the object was observed within the scene by a total number of times the scene was observed.

7. The system of claim 6, wherein the method performed by the processor further comprises:
    receiving a query related to the cluster labeled by the scene;
    determining whether the membership strength of the object satisfies a membership strength threshold; and
    outputting, in response to a determination that the membership strength of the object satisfies the membership strength threshold, the object as a response to the query.

8. The system of claim 6, wherein refining the knowledge graph includes:
    creating a classification corresponding to the cluster within the knowledge graph;
    determining whether the membership strength between the object and the cluster satisfies a membership strength threshold; and
    adding, in response to determining that the membership strength between the object and the cluster satisfies the membership strength threshold, a relationship between the object and the classification within the knowledge graph.

9. The system of claim 6, wherein refining the knowledge graph includes:
    creating a classification corresponding to the cluster; and
    creating a relation between the classification and the set of objects within the knowledge graph.

10. The system of claim 6, wherein prior to storing the set of objects in the cluster labeled by the scene, the method performed by the processor comprises:
    determining a classification label confidence of each object of the set of objects; and
    comparing the classification label confidence of each object of the set of objects to a classification label confidence threshold to determine a subset of objects of the set of objects which satisfy the classification label confidence threshold, wherein only the subset of objects is stored in the cluster labeled by the scene.

11. A computer program product comprising a computer readable storage medium having program instructions embodied therewith, the program instructions executable by a processor to cause the processor to perform a method comprising:
    identifying, by performing image processing on an image, a scene and a set of objects within the scene of the image;

storing, by a processor, the set of objects in a cluster labeled by the scene;

refining, by the processor, using the cluster, a knowledge graph; and determining a membership strength between an object of the set of objects and the cluster labeled by the scene, wherein the membership strength is determined by dividing a number of times the object was observed within the scene by a total number of times the scene was observed.

12. The computer program product of claim 11, wherein the method performed by the processor further comprises:

receiving a query related to the cluster labeled by the scene;

determining whether the membership strength of the object satisfies a membership strength threshold; and outputting, in response to a determination that the membership strength of the object satisfies the membership strength threshold, the object as a response to the query.

13. The computer program product of claim 11, wherein refining the knowledge graph includes:

creating a classification corresponding to the cluster within the knowledge graph;

determining whether the membership strength between the object and the cluster satisfies a membership strength threshold; and creating, in response to determining that the membership strength between the object and the cluster satisfies the membership strength threshold, a relationship between the object and the classification within the knowledge graph.

14. The computer program product of claim 11, wherein prior to storing the set of objects in the cluster labeled by the scene, the method performed by the processor comprises:

determining a classification label confidence of each object of the set of objects; and comparing the classification label confidence of each object of the set of objects to a classification label confidence threshold to determine a subset of objects of the set of objects which satisfy the classification label confidence threshold, wherein only the subset of objects is stored in the cluster labeled by the scene.

15. The computer program product of claim 11, wherein the program instructions are downloaded to the computer readable storage medium from a distributed data processing system.

* * * * *